US006380938B1

(12) United States Patent
Ngan

(10) Patent No.: US 6,380,938 B1
(45) Date of Patent: Apr. 30, 2002

(54) METHOD OF CONSTRUCTING A SOLID GRAPH USING HONEYCOMB CELLS

(76) Inventor: Ka-ham Ngan, 62C, Leighton Road, 4th Floor Causeway Bay, Hong Kong Special Administrative Region (CN)

( * ) Notice: Subject to any disclaimer, the term of this patent is extended or adjusted under 35 U.S.C. 154(b) by 0 days.

(21) Appl. No.: 09/486,123

(22) PCT Filed: Aug. 21, 1998

(86) PCT No.: PCT/CN98/00171

§ 371 Date: Jun. 9, 2000

§ 102(e) Date: Jun. 9, 2000

(87) PCT Pub. No.: WO99/10842

PCT Pub. Date: Mar. 4, 1999

(30) Foreign Application Priority Data

Aug. 25, 1997 (CN) ..................................... 97 1 17780.5

(51) Int. Cl.7 ............................................... G06T 11/20

(52) U.S. Cl. ...................... 345/440; 345/441; 345/420; 345/423

(58) Field of Search ................................ 345/440, 441, 345/472, 418, 428, 427, 426, 420, 423, 424, 581, 582, 589, 591; 428/593; 502/527.19

(56) References Cited

U.S. PATENT DOCUMENTS

| | | | | | |
|---|---|---|---|---|---|
| 4,340,281 | A | | 7/1982 | McIntyre | 351/6 |
| 4,696,400 | A | | 9/1987 | Warman | 206/575 |
| 5,602,979 | A | * | 2/1997 | Loop | 345/423 |
| 5,917,544 | A | * | 6/1999 | Sobotta et al. | 348/222 |
| 6,057,538 | A | * | 5/2000 | Clarke | 250/208.1 |
| 6,078,331 | A | * | 6/2000 | Pulli et al. | 345/423 |
| 6,131,840 | A1 | * | 1/2001 | Ukai et al. | 242/314 |
| 6,137,492 | A1 | * | 2/2001 | Hoppe | 345/420 |
| 6,141,124 | A1 | * | 3/2001 | Suzuki et al. | 359/15 |
| 6,144,972 | A1 | * | 10/2001 | Abe et al. | 707/501.1 |
| 6,301,051 | B1 | * | 10/2001 | Sankur | 359/626 |
| 6,324,469 | B1 | * | 11/2001 | Okude et al. | 701/208 |

FOREIGN PATENT DOCUMENTS

| | | |
|---|---|---|
| EP | 0 299 769 | 1/1989 |
| EP | 0 462 788 A2 | 12/1991 |
| GB | 2 127 753 | 4/1984 |

* cited by examiner

*Primary Examiner*—Matthew Luu
*Assistant Examiner*—Thu-Thao Havan
(74) *Attorney, Agent, or Firm*—Burns, Doane, Swecker & Mathis, L.L.P.

(57) ABSTRACT

The present invention uses a kind of special honeycomb structure elements, at first an image is decomposed into hexagonal pixels with the aid of great computing and storing capacity of a computer and by using the programs developed by the inventor, then a large number of honeycomb structure elements of various shapes are combined, and a required complete image is formed by putting together the honeycomb structure elements. After the required image composed of the honeycomb structure elements is formed, the corresponding elements are selected from the prepared honeycomb structure elements (such as ceramic tiles or glass, etc.) of various colors by using the mode of mechanization or manual labor so as to fulfill the formation a substantial image on a base, or directly draw colors on the base based on the honeycomb structure elements.

10 Claims, 11 Drawing Sheets

METHOD OF CONSTRUCTING A SOLID GRAPH USING HONEYCOMB CELLS

The present invention generally relates to a method of constructing a two-dimensional substantial image, and more particularly to an image forming method, i. e., in a computer, the structure of honeycomb elements is used to construct an inputted image by redividing it into blocks, then a substantial image for practical use is formed on the basis of the above reconstructed image.

In ancient and contemporary architecture, mosaics made up from substantially the same square building materials (such as ceramic tiles, glass, etc.) are commonly seen, for example, mosaics made up from small square ceramic tiles or natural stones came into being before the Christian Era. In the contemporary times, on the walls of a public place and a large building, the architectural art of mosaics made up from ceramic tiles, natural stones and even from metal patchwork is more popular. Besides, in the inside of a building, such as the floor, the walls of a toilet, etc., various images (hereinafter referred to as "substantial image") made up from decoration materials can be often seen. Such an organic combination of architecture and art gives people a plentiful and wonderful visual feeling. Moreover, such a substantial image is durable and will not be easy to damage, and it has a great practical value.

But the tesserae used for a conventional substantial image are square or almost square, of uniform size or similar size. Sometimes, at the junction of two colors, the junction line is made to be more smooth by cutting a tessera off along the diagonal. Though such a mending method is used, its square structural form still makes the whole image appear dull.

In order to make some changes in such a dull image, sometimes, besides that a large number of small square tesserae are used in a substantial image, a small number of large square tesserae are used. Sometimes, for the necessity of constructing an image, square tesserae have to be arranged in a curved shape, it will unavoidably causes many triangular or trapezoidal gaps that cannot be mended. Using square tesserae to fulfill various artistic conceptions of an artist will put him into a dilemma without doubt. However, some very fine crafted creations (such as ancient mosaics) looking like seamless were found in history, but each small tessera used was fulfilled by using a large amount of manpower and it took a lot of time. Obviously, it is not suitable to the requirements for a large scale, high efficiency, even mechanization and automation of modern architecture or room decoration.

Therefore, the object of the present invention is to provide a method of constructing a substantial image, which can reasonably divide an original image into tesserae that are easy to quickly and efficiently put together, so as to be suitable for large-scale industrial operation as well as maintaining the artistic integrity of the image used.

To fulfill the above object, the present invention uses a kind of special honeycomb structure elements, at first an image is decomposed into hexagonal pixels with the aid of great computing and storing capacity of a computer and by using the programs developed by the inventor, then a large number of honeycomb structure elements of various shapes are combined, and a required complete image is formed by putting together the honeycomb structure elements. After the required image composed of the honeycomb structure elements is formed, the corresponding elements are selected from the prepared honeycomb structure elements (such as ceramic tiles or glass, etc.) of various colors by using the mode of mechanization or manual labor so as to fulfill the formation of a substantial image on a base, or directly draw colors on the base based on the honeycomb structure elements.

The method of constructing a two-dimensional substantial image using honeycomb structure elements according to the above conception of the present invention comprises the following steps:

inputting a required image to a computer;

dividing the square grid structure pixels of the image into groups to form new hexagonal pixels containing a plurality of grid structure pixels;

using at least one hexagonal pixel to form a plurality of honeycomb structure elements of various different shapes and different colors, of which the color of the hexagonal pixel is an average value of the plurality of grid structure pixels contained therein;

storing the plurality of the formed honeycomb structure elements for future use;

making operation by dividing the image into blocks according to the colors of the inputted image, then using the stored honeycomb structure elements according to the required shapes;

forming a new image composed of the honeycomb structure elements and outputting it;

putting together the elements on a substantial base in certain proportion or drawing a color substantial image according to the outputted image.

A substantial image constructed from the honeycomb structure elements of the present invention can not only be quickly formed, but can also maintain the artistic quality of the originally inputted image, it can also give people a visual feeling of irregularity, and it can fulfill tight seaming through a modernized mechanism.

According to a preferred embodiment of the present invention, the principle of the present invention and the details of the method of the present invention are specifically stated as below.

Figure 9:
FIG. 9 shows an image constructed by pixels in a conventional grid structure.
Figure 10:
FIG. 10 shows an image constructed by using hexagonal pixels of the present invention, of which one projection shape represents one hexagon.

The method of inputting an image shown in a drawing such as FIG. 9 to a computer belongs to known technology. The more commonly used include: (a) a digitized card for converting an analog signal outputted by a pick-up camera to a digital signal so as to be processed by a computer, and an image file is stored with the aid of stored software; (b) a scanner for scanning photos, pictures or positive and negative films, and an image file is stored by a computer; (c) a digital camera for storing an image on a magnetic disc after a photo is taken, then the image file stored on the magnetic disc can be accessed through a computer.

The conventional pixels are formed from a square grid structure. In detail, pixels are arranged one line after another, the pixels of the first line and the pixels of the second line are arranged sequentially and opposite to each other so as to form a grid structure, assuming that the width of an image is 640, then there are 640 pixels in each line, and the 641st pixel is the first pixel of the second line.

According to the present invention, the pixels of a grid structure are converted to hexagonal pixels. According to a preferred embodiment of the present invention, such a converting process is described as below.

Figure 1:
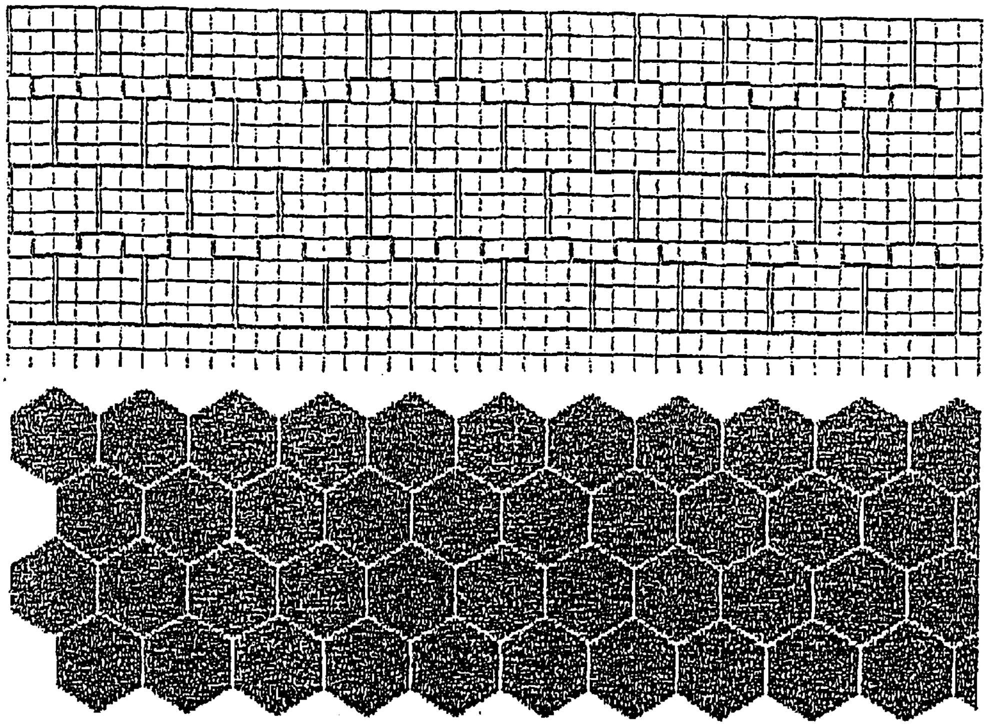
FIG. 1 shows pixels in a conventional grid structure and hexagonal pixels according to the present invention.

As shown in FIG. 1, 4, 4, 4, 2 symmetric pixels (altogether 14 pixels) of a grid structure are taken from the first to fourth lines of the pixels of the grid structure to form a hexagonal pixel of the first line of the honeycomb structure of the present invention; 2, 4, 4, 4 symmetric pixels (altogether 14 pixels) of the grid structure are taken from the suitable positions of the fourth to seventh lines of the pixels of the grid structure to form a hexagonal pixel of the second line of the honeycomb structure of the present invention, the other are on the analogy of the above. Obviously, for an image with 640 pixels per line, the first hexagonal pixel of the first line of the image constructed by the honeycomb structure of the present invention is converted from pixels 1, 2, 3, 4, 641, 642, 643, 644, 1281, 1282, 1283, 1284, 1922 and 1923 (altogether 14 pixels) of the image of the grid structure. Similarly, the first hexagonal pixel of the second line of the image of the honeycomb structure is converted from pixels 1924, 1925, 2563, 2564, 2565, 2566, 3203, 3204, 3205, 3206, 3843, 3844, 3845 and 3846 (altogether 14 pixels) of the image of the grid structure.

In the upper part of FIG. 1, each small square represents a pixel in the grid structure, and in the lower part, each hexagon is a hexagonal pixel converted from 14 pixels in the grid structure, these hexagonal pixels form the basic elements of the honeycomb structure of the present invention.

Besides, the colors of the hexagonal pixels use the average value of the colors of the 14 pixels in the grid structure, i. e., the average value of red, green and blue is used respectively. For example, if an image is scanned, generally, there are 256 times 256 times 256 colors (or even more). But the following substantial elements cannot provide so many colors, furthermore, so many colors cannot be visually distinguished, actually there is no need for so many colors. Therefore a range should be preset according to the need for the effect and the resource of the substantial elements provided. As the color space is a three-dimensional cube, three basic colors, red, green and blue, each occupy one of the dimensions. To cut the whole cube into many small cubes, any average value of the 14 pixels of the grid structure within a certain small cube is replaced with the same color, any small cube not including the average value of the 14 pixels of the grid structure therein is considered not to exist (i. e., it is considered that the color doesn't exist). Therefore, after the whole cutting process is finished, it will be known how many kinds of colors are used. If the number of the colors used is smaller than expected by comparison with the preset range, the size of the cubes will be reduced and the process repeated. If the number of the colors used is larger than expected, the size of the small cubes will be increased and the process repeated. The above steps are repeated until the preset range is fulfilled.

Each hexagonal pixel formed as stated above has six sides, each pixel (excluding four corners and four sides of the image) on the image of the honeycomb structure of the present invention constructed by these hexagonal pixels adjoins the other six pixels. Hence the honeycomb structure elements formed from a number of the hexagonal pixels will have much more changes as compared with the elements of the grid structure so as to overcome the dull condition of the grid structure and provide unlimited room for change. Only such a hexagonal pixel can closely adjoin the adjacent pixels in six directions to form the honeycomb structure elements of many different sizes and shapes.

Figure 2:
FIGS. 2–4 show honeycomb elements of various structures formed by hexagonal pixels according to the present invention.
Figure 3:
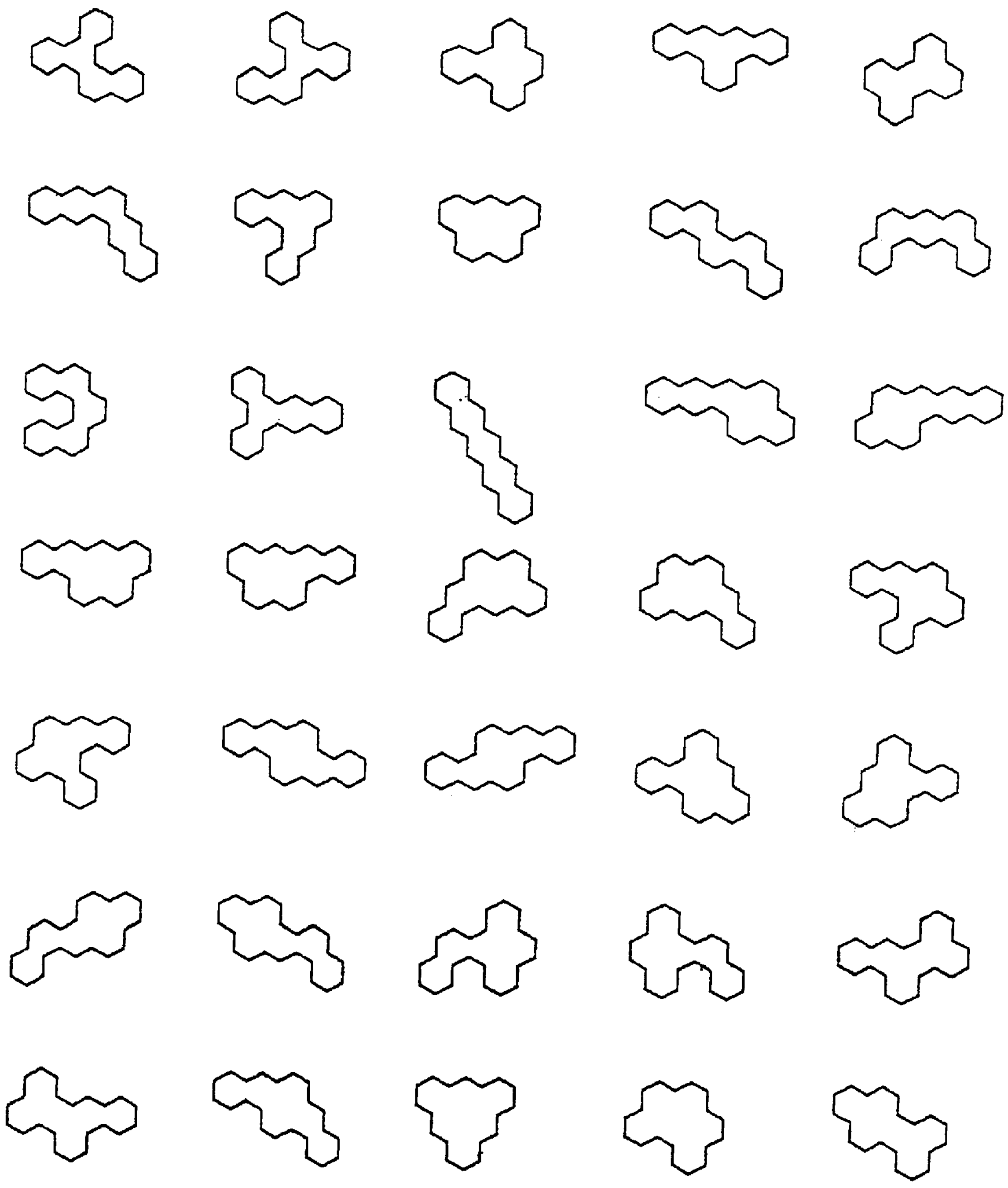
Figure 4:
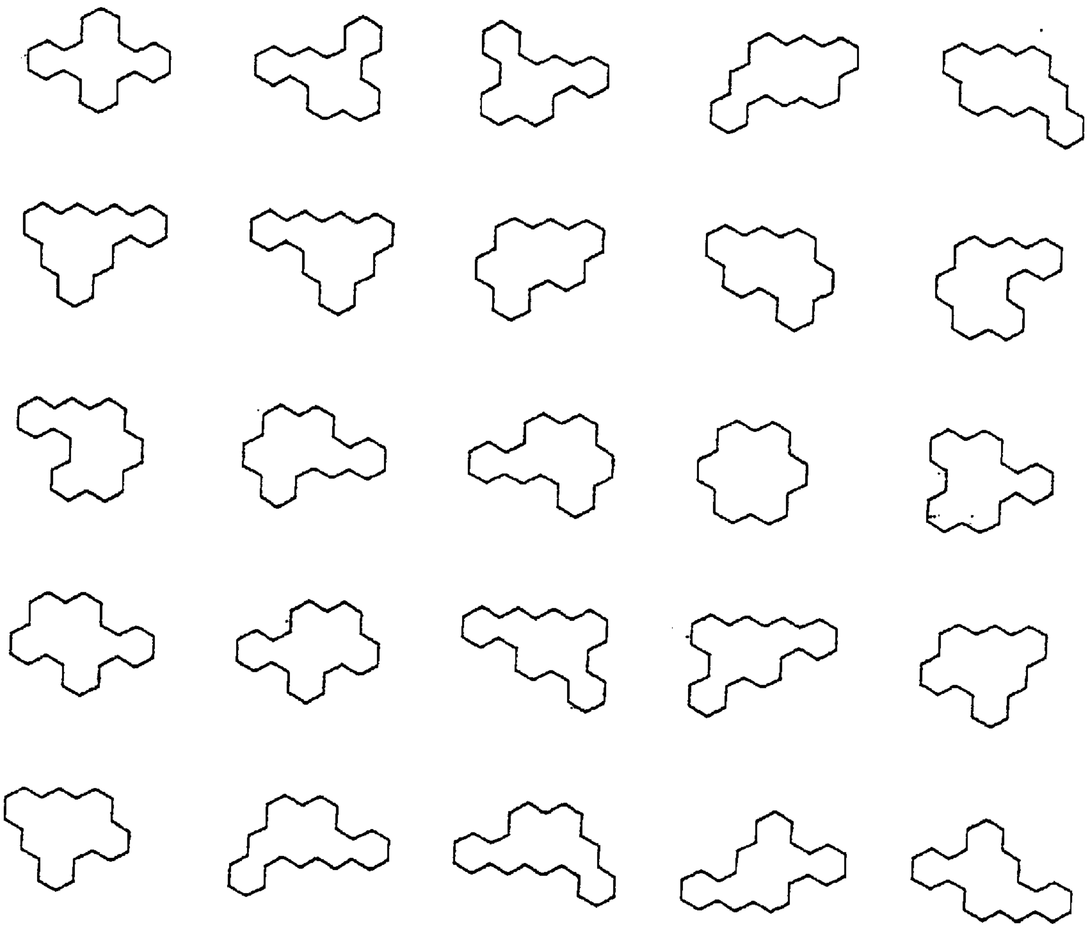

In other words, a honeycomb structure element is a combination of at least one hexagonal pixels of the same color, the hexagonal pixels within the honeycomb structure element are put together according to the characteristics of the honeycomb structure, each hexagonal pixel within the element at least adjoins another hexagonal pixel, that is to say, at least there is a common side between each pixel within the same element and the other pixel. It shows that each honeycomb structure element is just a small honeycomb structure, in other words, each honeycomb structure element is just a part of the honeycomb structure. As shown in FIGS. 2–4, each honeycomb structure element is an individual and separated one.

Figure 5:
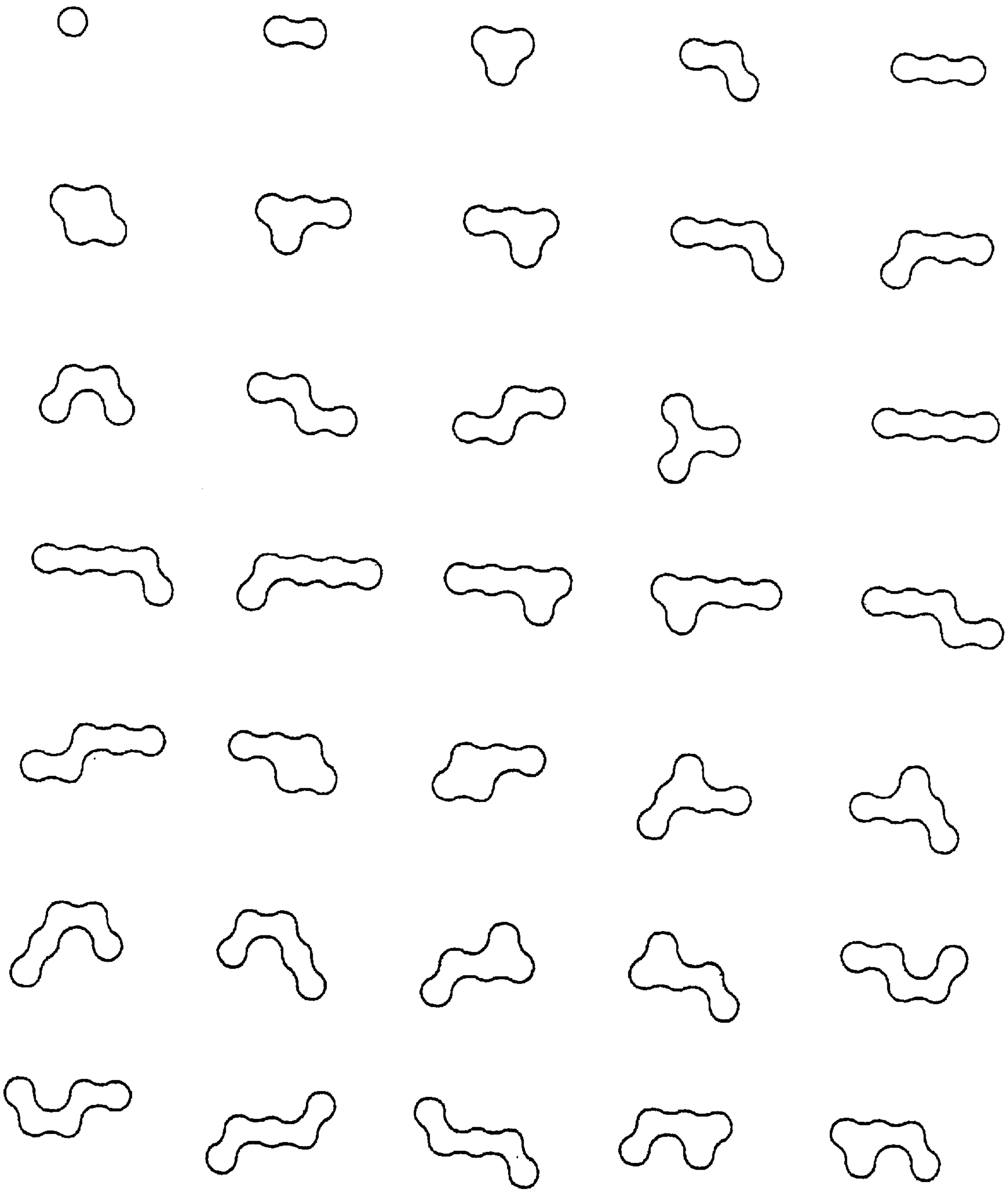
FIGS. 5–7 show honeycomb structure elements shown in FIGS. 2–4 after trimming.
Figure 6:
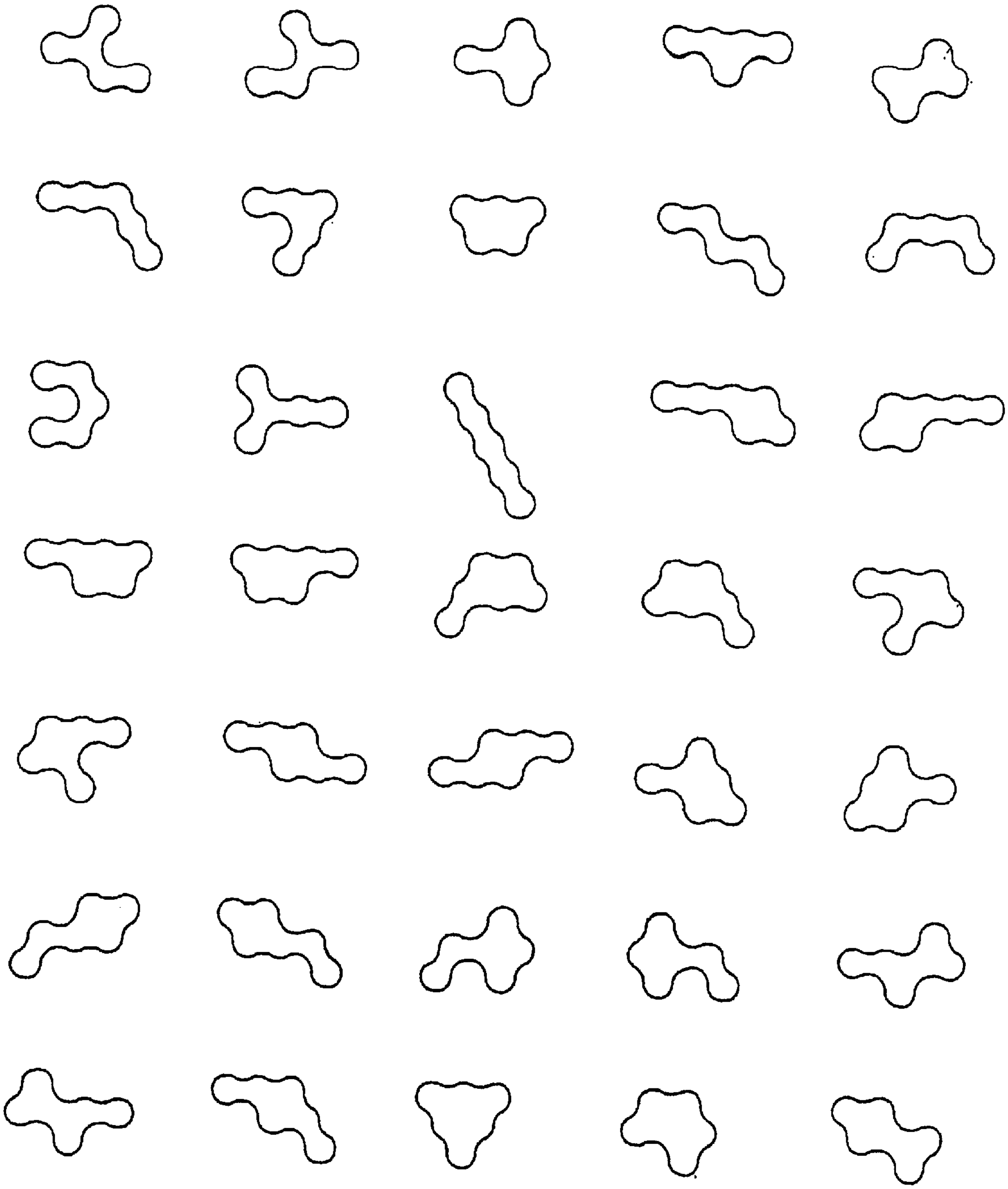
Figure 7:

Certainly, the respective honeycomb structure elements may also be modified by smooth curves as shown in FIGS. 5–7.

Figure 8:
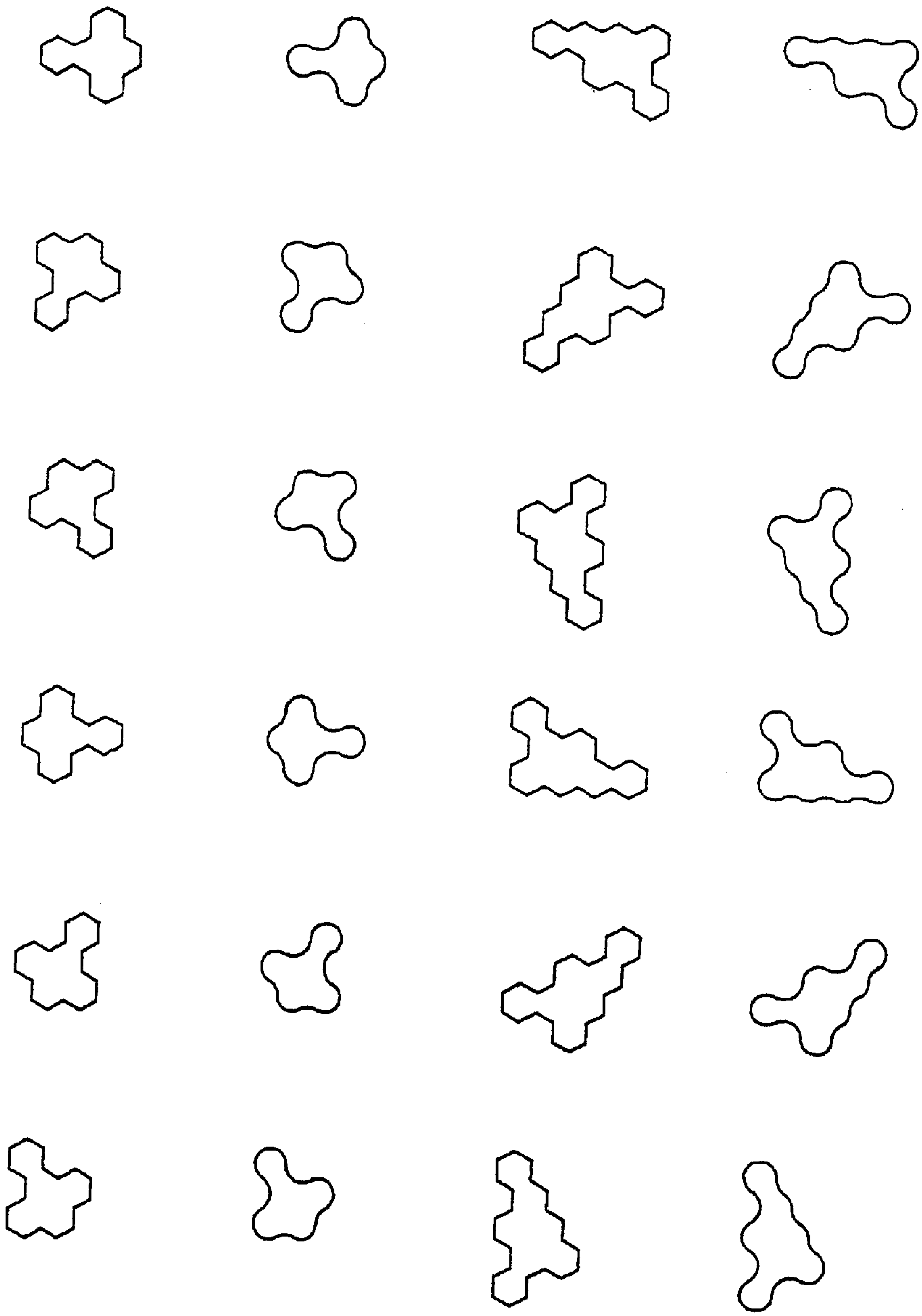
FIG. 8 shows a schematic diagram of the same honeycomb structure elements in six different orientations.

After processing by a computer the image formed by the honeycomb structure elements is outputted to a data file, by using the data of the honeycomb structure elements, the computer can control a mechanism such as a drawing instrument or a robotic arm and the like so as to draw the substantial elements with the corresponding colors and shapes one by one on a base (such as paper, cloth, plastic sheet, etc.) with pigment or paint. Certainly, it can also control a mechanical equipment to form the respective substantial elements of solid substances (such as metal, glass, pottery, porcelain, cloth, wool fabric, plastics, etc.) corresponding to the honeycomb structure elements produced in the computer and arrange them on a substantial base sequentially so as to form a substantial image. In the above drawing or forming process, on the base, each honeycomb structure element may have six orientations for arrangement. As shown in FIG. 8, the same element may have 0, 60, 120, 180, 240 and 300 degrees of angles. Each honeycomb structure element in the above is single-colored.

In order to more clearly state the present invention, the process of forming a single-colored honeycomb structure element by decomposing an image of the honeycomb structure will be specifically stated as below.

A. A set of elements of various shapes are arranged, six orientations of each element are taken as six different states, a database is established by using the shapes of the quantity of six times of the elements, and dividing them into groups is according to the number of the included pixels, that is to say, the number of four pixels included is taken as one group and the number of six pixels included is taken as one group, and on the analogy of this.

B. A single-colored and individual segment is separated from the image of the whole honeycomb structure, one segment represents a group of pixels. Each pixel in the group at least adjoins another pixel in the same group, that is to say, at least there is a common side between each pixel and the other pixel in the same group, in other words, except the pixels in the segment itself, no other pixel adjoins any pixel in the segment. One segment may include very few pixels and may also include several thousands of pixels or more.

C. If there are more than 30 pixels in a segment, the first attempt to make decomposition is to use the elements with the largest number of pixels. If the process fails, decomposition is tried by reducing the number of pixels until one element is formed through the decomposition. Then the process is continued by using the elements with the largest number of pixels. If the remained pixels are still over 30, the process of this stage will be repeated. If the pixels are reduced to below 30, the process will be carried out according to the process stated in the following stage D. The principle is just that when there is a large number of pixels, the elements with a large number of pixels will be used as much as possible so as to cut down on the work of manufacturing, processing, arranging and inlaying.

D. If there are only 30 pixels or less in a segment at the beginning, or when the number of the remained pixels is reduced to 30 pixels or less, according to a special plan, an element is formed through decomposition, for example, the following is a solution for 18 pixels:
three 6-pixel elements; or
two 5-pixel elements plus two 4-pixel elements; or
one 6-pixel element plus three 4-pixel elements; or
three 4-pixel elements plus two 3-pixel elements.

If the first solution doesn't work, then the next one will be used because the arrangement of the pixels in a segment is irregular. Though there are many shapes of the honeycomb structure elements, it is not possible to include all the shapes, hence it may not work if a smaller number of elements including more pixels are used, but using more elements including a smaller number of pixels will finish the plan more probably. So the basic principle is just that when there is a small number of pixels, according to the above solution, the object of evenness will be fulfilled.

E. A trial method is used to arrange honeycomb structure elements. Assuming that the group of the number of the pixels included in the honeycomb structure elements provided in stages C, D is N, the data of a honeycomb structure element is taken from the group of the number N of the pixels in the database mentioned in stage A, it is judged whether the following two requirements are met by comparison of the provided data with the data of a segment:
   a. The whole honeycomb structure elements are in the segment;
   b. The evenness of the size of the honeycomb structure elements in the segment is not affected, for example, it is not acceptable if a 7-pixel honeycomb structure element is arranged and one or two pixels are separated from it to form a small honeycomb structure element.

The honeycomb structure elements including the number N of the pixels are taken out one by one for trial. If one honeycomb structure element conforms with b as well as conforming with a, the number of the pixels of the next honeycomb structure element is taken immediately according to the stages C, D, then the operation process of this stage is carried out. If all the honeycomb structure elements in the group of the number N of the pixels are tried one by one, but not any one can conform with b as well as conforming with a, the number of the pixels included in the next honeycomb structure element is taken according to the stages C, D, then the operation process of this stage is carried out. Each time after one honeycomb structure element is formed through decomposition, the information of the position, orientation, color and shape of the honeycomb structure element is stored in a file for future use.

F. Another single-colored segment is formed through decomposition according to B, the operation processes of C to F are repeated until all the single-colored segments are processed.

Figure 11:
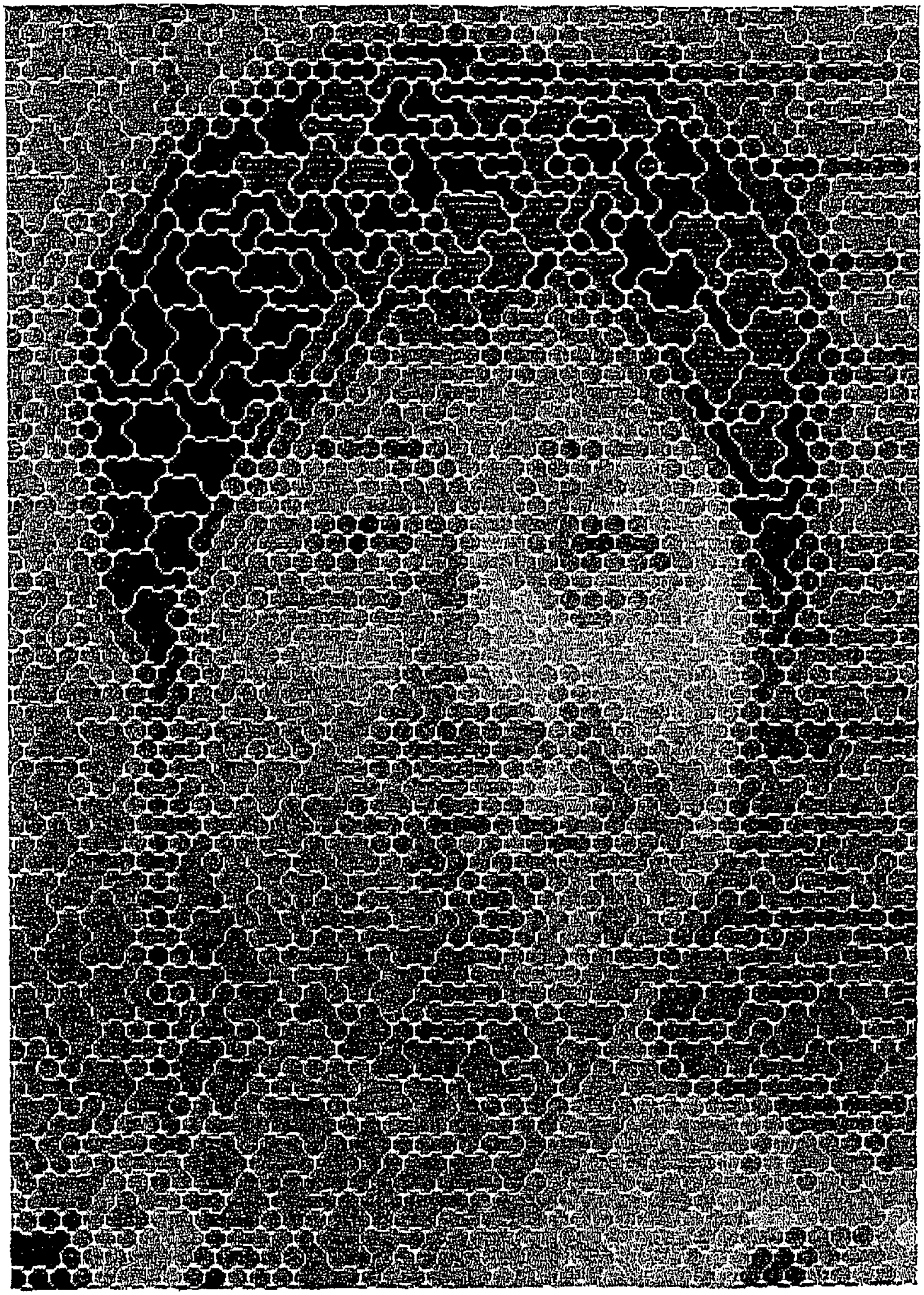
FIG. 11 shows an image constructed by honeycomb structure elements for outputting after the various honeycomb structure elements are formed by hexagonal pixels according to the present invention.

As stated in A to F, a two-dimensional image may be decomposed into a plurality of the above single-colored honeycomb structure elements, the results are shown in FIGS. 9 and 11. FIG. 9 shows an image of a grid structure, it can be said that the image in FIG. 11 is the result of the image of FIG. 9 through the processing of the above respective stages. It should be noted that many same color (as a color drawing cannot be used, colors can only be distinguished in gray shading scales) honeycomb structure elements are adjoined, it is because in practical use, usually the maximum value of the number of the pixels included in the elements is not large, and the number of a whole set of different honeycomb structure elements should also be restricted to a proper number and they are predetermined. As stated above, it should also be determined within the range how many colors are used.

As an example, if the elements with 95 shapes and 80 colors are chosen, there are 7600 shape-color elements altogether, each honeycomb structure element has six orientations, visually, there are more than 45000 different shape-color-orientation combinations. Assuming that the resource is not sufficient and the honeycomb structure elements with 50 shapes and 60 colors are used, there are altogether 3000 shape-color combinations. Since each element has six orientations, visually, more than 17000 shape-color orientations can be provided. The variety is tremendous. Even if it is viewed from a short distance, it is picturesque. It is not like the traditional mosaics of ceramic tiles that are only suitable for viewing from a long distance.

It seems that 7600 kinds of different substantial honeycomb structure elements are a large number. Actually if there are 95 different shapes on a casting mold, each time when the casting is made, 95 elements with the same color and different shapes are produced, only if the casting is made 80 times, every element is included. As compared with tens of colors, countless petal shapes, countless leaf shapes and veins, and flower cores, branches, various kinds of silk cloth, plastics, iron wires, etc. in a factory for producing silk flowers, it can be said that to produce more than 7000 elements of the same material is simple. Moreover, it is seen from the required storage space that assuming each element occupies a space of 25 mm times 20 mm times 3 mm, then each cubic meter can store more than 660,000 elements, which form 33 images with 20,000 honeycomb structure elements each, the size of each image being 1 square meter. Other equipment for locating the elements needs to be added, and the occupied space may be expanded to 3 cubic meters. Therefore the occupied space is very small even for a very small-sized factory.

Not only there is no difficulty in storage, but the time for producing a substantial image according to the method of the present invention can also be greatly reduced. There is no need to draw the required picture on a solid element in advance, then it is sintered, it will consume a lot of money as well as a lot of time. By using the method of the present invention, putting together the substantial elements will take only a few days, and it does not require the whole process of direct drawing.

Most of the time spent is for producing the substantial elements and putting them together or drawing. The time required for processing by a computer is relatively short. The processes of manual production and mechanized production are respectively stated as below.

In a small workshop, substantial honeycomb structure elements can be arranged manually so as to obtain a substantial image. If an image of the honeycomb structure as shown in FIG. 11 has been obtained on a computer, and the four sides of the image are marked with a scale, then it only needs to place a rule in the X and Y directions respectively, the positions of the respective points on the image will be known.

Simultaneously, if you have arranged all the required substantial honeycomb structure elements as stated above and have a list stating the information of the shapes, positions, orientations, colors, etc. of the respective elements (these data are stored in the database stated in the above stage E), you only need to take out the substantial honeycomb structure elements one by one according to the serial numbers of the listed elements and colors and arrange them on a substantial base according to the listed positions until the whole image is fulfilled. It should be noted that in the process of arranging a slow-curing and transparent bonding agent shall be used first. The permanent bonding agent will not be used for fixing until the arrangement of all the substantial elements is fulfilled.

Of course, it is easier to use the automatic equipment of a robotic arm and the like controlled by a computer for directly arranging and inlaying the substantial honeycomb structure elements. For example, certain types are provided with a drawing instrument having a working platform and trademark cutter, etc., it can meet the requirements through slight change. As generally the weight of a substantial element doesn't exceed 2 grams, if some other equipments are added, the weight load is not a problem. The specific processes of arranging and fixing the substantial elements are similar to the above. It is unnecessary to state them again.

The preferred embodiment of the present invention stated above merely states the present invention by making examples. It should be understood that ordinary persons skilled in the art can make various modifications within the spirit and scope of the present invention.

What is claimed is:

1. A method of constructing a two-dimensional substantial image using honeycomb structure elements, characterized in that it comprises the following steps:

inputting a required image to a computer;

dividing the square grid structure pixels of the image into groups to form new hexagonal pixels containing a plurality of grid structure pixels;

using at least one hexagonal pixel to form a plurality of honeycomb structure elements of various different shapes and different colors, of which the color of the hexagonal pixel is the average value of the plurality of grid structure pixels contained therein;

storing the plurality of the formed honeycomb structure elements for future use;

making operation by dividing the image into blocks according to the colors of the inputted image, then using the stored honeycomb structure elements according to the required shapes;

forming a new image composed of the honeycomb structure elements and outputting it;

putting together the elements on a substantial base in certain proportion or drawing a substantial image according to the outputted image.

2. The method of constructing a two-dimensional substantial image according to claim 1, characterized in that said elements are in the form of honeycomb structure.

3. The method of constructing a two-dimensional substantial image according to claim 1, characterized in that said hexagonal pixel is formed symmetrically from 14 pixels of a grid structure.

4. The method of constructing a two-dimensional substantial image according to claim 1, characterized in that said honeycomb structure elements are single-colored.

5. The method of constructing a two-dimensional substantial image according to claim 1, characterized in that the operation of dividing said square grid structure pixels into groups further comprises the following steps:

a three-dimensional cube in which three basic colors, red, green and blue, each occupying one of the dimensions, is cut into many small cubes, any average value of the 14 pixels of the grid structure within a certain small cube is replaced with the same color, any small cube not including the average value of the 14 pixels of the grid structure therein is considered non-existent, after the whole cutting process is finished, the total number of colors will be known.

6. The method of constructing a two-dimensional substantial image according to claim 5, characterized in that if the number of the colors used is small compared with the preset range, the size of the cubes will be reduced, the steps stated in claim 5 are repeated to find the new number of colors used, if the number of the colors used is large compared with the preset range, the size of the cubes will be increased, the steps stated in claim 5 are repeated to find the new number of colors used, the above steps are repeated until the preset range is fulfilled.

7. The method of constructing a two-dimensional substantial image according to claim 1, characterized in that said operation of dividing the image into blocks comprises the following steps:

A. a set of elements of various shapes are arranged, six orientations of each element are taken as six different states, a database is established by using the shapes of the quantity of six times of the elements, and dividing them into groups is according to the number of the included pixels, that is to say, the number of each kind of pixels is divided into one group;

B. a single-colored and individual segment is separated from the image of the whole honeycomb structure, one segment represents a group of pixels; each pixel in the group at least adjoins another pixel in the same group, that is to say, at least there is a common side between each pixel and the other pixel in the same group;

C. if there are more than 30 pixels in a segment, the first attempt to make decomposition is to use the elements with the largest number of pixels, if the process fails, decomposition is tried by reducing the number of pixels until one element is formed through the decomposition; then the process is continued by using the elements with the largest number of pixels, if the remained pixels are still over 30, the process of this stage will be repeated, if the pixels are reduced to below 30, the process will be carried out according to the process stated in the following stage D;

D. if there are only 30 pixels or less in a segment at the beginning, or when the number of the remained pixels is reduced to 30 pixels or less, according to a special solution, an element is formed through decomposition, if the first solution doesn't work, then the next one Will be used, the special solution is used for making the pixels included in the respective elements more even, the following are the special solutions for 18 pixels:

three 6-pixel elements; or two 5-pixel elements plus two 4-pixel elements; or one 6-pixel element plus three 4-pixel elements; or three 4-pixel elements plus two 3-pixel elements;

E. assuming that the number of the pixels included in the honeycomb structure elements provided in stages C, D is N, the file of a honeycomb structure element is taken from the group of the number N of the pixels in the database mentioned in stage A, it is judged whether the following two requirements are met by comparison of the provided data with the data of a segment:
 a. the whole honeycomb structure elements are in the segment;
 b. the evenness of the size of the honeycomb structure elements in the segment is not affected,
 if one honeycomb structure element conforms with a as well as b, the number of the pixels of the next honeycomb structure element is taken immediately according to stages C, D, then the operation process of this stage is carried out, if all the honeycomb structure elements in the group of the number N of the pixels are tried one by one, but none can conform with a as well as b, the number of the pixels included in the next honeycomb structure element is taken according to stages C, D, then the operation process of this stage is carried out;
 each time after one honeycomb structure element is formed through decomposition, the information of the position, orientation, color and shape of the honeycomb structure element is stored in a file for future use;

F. another single-colored segment is formed through decomposition according to B, the operation processes of C to F are repeated until all the single-colored segments are processed.

8. The method of constructing a two-dimensional substantial image according to claim 1, characterized in that the computer for outputting said output image constructed by said honeycomb structure elements is connected with an automatic equipment for automatically arranging and fixing the substantial honeycomb structure elements.

9. The method of constructing a two-dimensional substantial image according to claim 8, characterized in that said automatic equipment is a robotic arm or the like.

10. The method of constructing a two-dimensional substantial image according to claim 1, characterized in that the step of putting together the elements or drawing a substantial image can be fulfilled manually.

* * * * *